May 16, 1939.  W. J. PODBIELNIAK  2,158,832
MECHANICAL RUBBING-TYPE SEAL
Filed Aug. 5, 1937  2 Sheets-Sheet 1
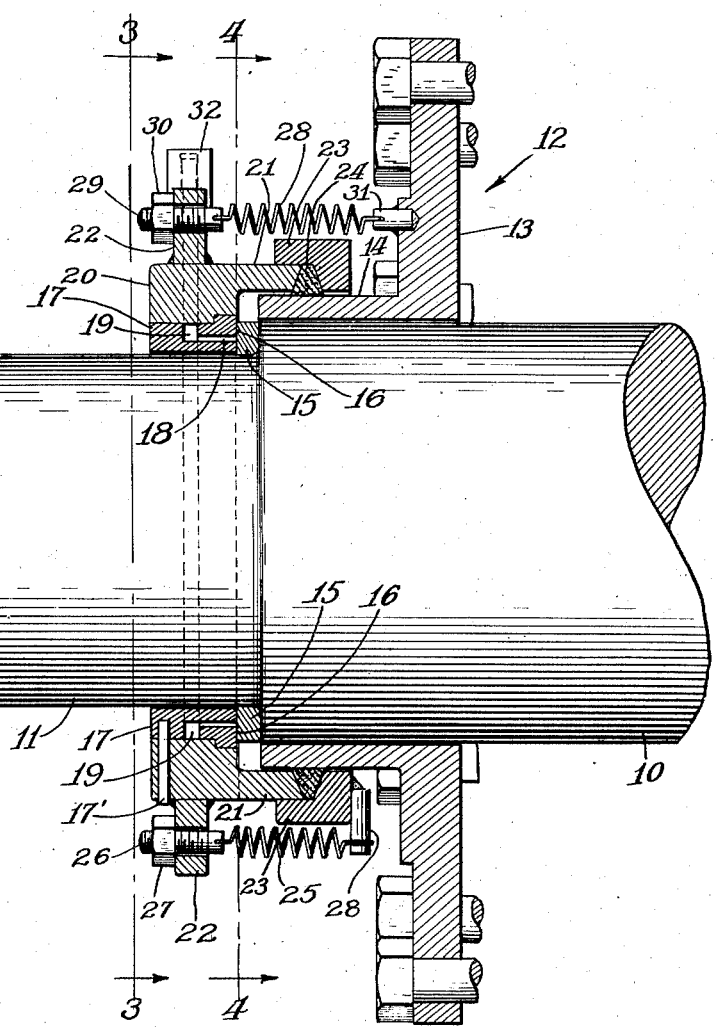
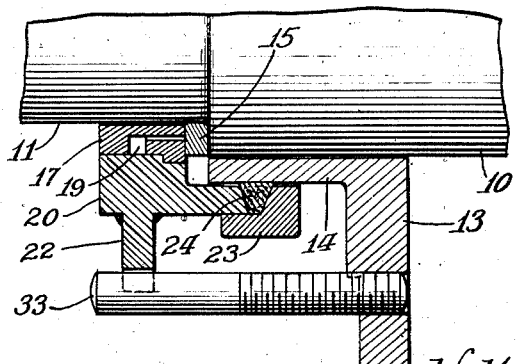
Inventor:
Walter J. Podbielniak
By [signature]
Attorney

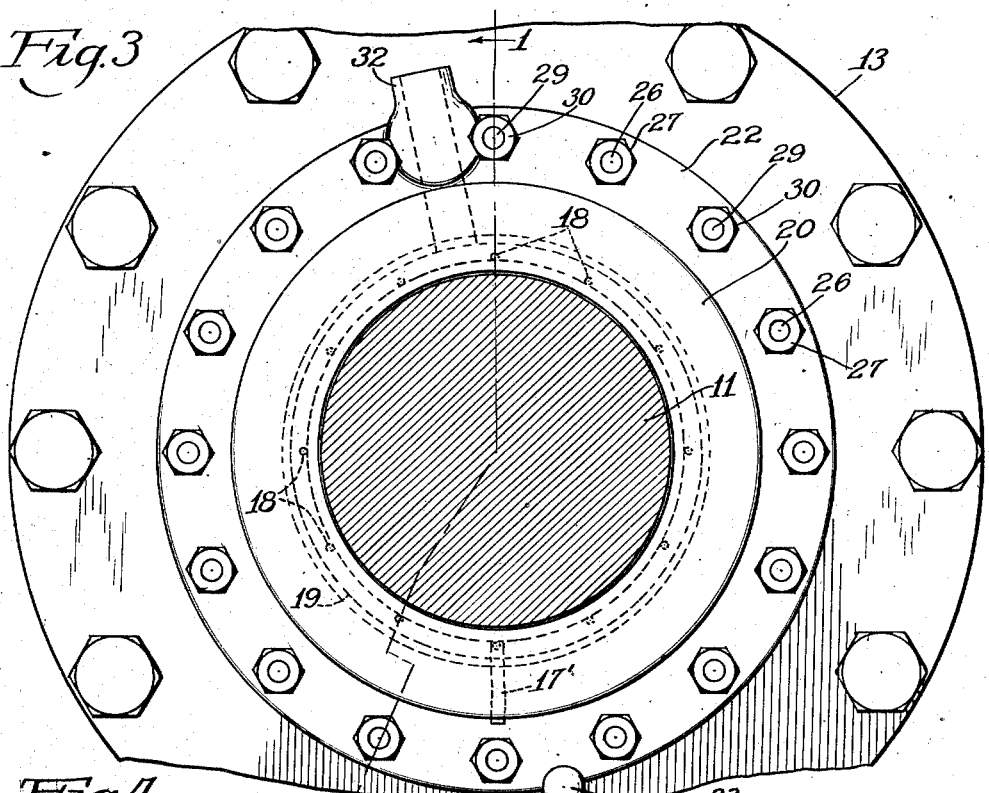
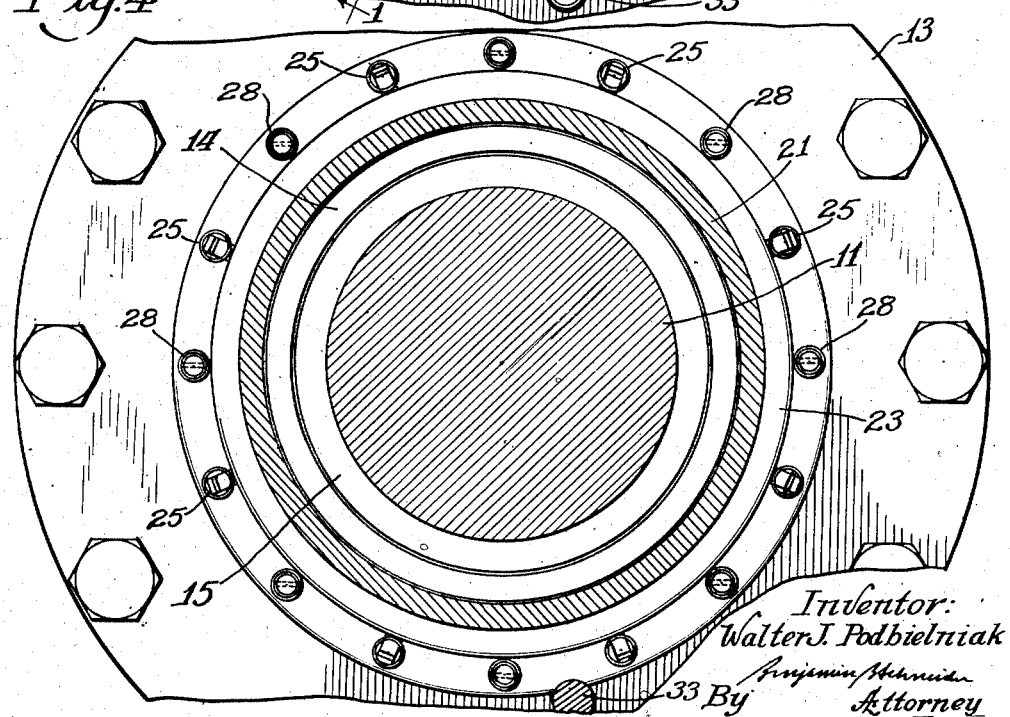

Patented May 16, 1939

2,158,832

UNITED STATES PATENT OFFICE 2,158,832

MECHANICAL RUBBING-TYPE SEAL

Walter J. Podbielniak, Chicago, Ill., assignor to Benjamin B. Schneider, Chicago, Ill.

Application August 5, 1937, Serial No. 157,517

3 Claims. (Cl. 286—7)

This invention relates to dry mechanical seals of the rubbing type and more particularly to seals of this character which are adapted for use with rotating shafts to prevent leakage of fluids, such as gases under pressure, along said shafts. The seals embodying my invention are admirably suited for use on centrifugal fluid-treating apparatus, centrifugal pumps, turbines and the like, as well as other apparatus employing large diameter shafts and high speeds of revolution.

In a known seal of the character embodying my invention the seal is provided with a collar and resilient means which are designed to rotate with the shaft. The diameter of the shaft which this seal will accommodate is limited since any increase in diameter of the shaft, at a given velocity, effects a substantial increase of the rubbing velocity at the area of contact of the seal and a consequent burning up and breakdown of the seal. It is thus obvious that the diameter of the shaft which this seal will accommodate, at a given velocity, is limited by the rubbing velocity at the area of contact of the seal; that is, the diameter of the shaft cannot be so large that it will produce a rubbing velocity sufficient to cause a burning up and break-down of the seal.

In accordance with my invention, I provide a stationary mechanical seal of the rubbing type which can accommodate rotating shafts of a diameter substantially larger than those accommodated in the prior art seals with substantially no increase of the rubbing velocity at the area of contact over that present in the prior art seals wherein shafts of smaller diameter are employed. This ability to accommodate shafts of larger diameter without increase in the rubbing velocity requires no concomitant compensation such as an increase in the length of the shaft or any other part. By construction in accordance with my invention I am enabled to provide a mechanical seal of the character described above.

Furthermore, in accordance with my invention, I am enabled to provide a stationary mechanical seal of the rubbing type which is simple in design and construction, readily accessible for inspection and adjustment even during rotation of the shaft and which is substantially free from the effects of any vibrations set up by the rotating shaft.

The invention possesses many other advantages which may be made more easily apparent from a consideration of the embodiment shown in the drawings. This embodiment will be described in detail to illustrate the invention; but it is to be understood that the invention is not limited to the details shown and described, except as set forth in the appended claims.

My invention is illustrated in the accompanying drawings wherein:

Figure 1 is a sectional view through my novel seal taken along the line 1—1 of Fig. 3, and showing a fragmentary portion of the shaft, in elevation, accommodated therein;

Fig. 2 is a fragmentary sectional view somewhat similar to Fig. 1 but showing the locking means for preventing rotation of the seal;

Fig. 3 is an end view of the seal, with the shaft in section, taken along the line 3—3 of Fig. 1; and Fig. 4 is a transverse section through the seal and shaft taken along the line 4—4 of Fig. 1.

In the drawings and referring particularly to Fig. 1, a rotatable shaft 10 having a portion 11 of reduced diameter is shown as passing through the stationary seal which is designated as a whole by the numeral 12.

The stationary seal 12 comprises a metal wall 13 of a container or housing (not shown) having a metal sleeve 14 projecting therefrom. The sleeve 14 is concentric with shaft 10 and extends along the shaft to the juncture of the enlarged portion thereof and the portion 11 of reduced diameter. As clearly shown in the drawing, sleeve 14 has a larger internal diameter than the shaft to permit free rotation of the latter within the sleeve.

An annular ring or collar 15 is forced onto the reduced portion 11 of shaft 10 as, for example, by a drive fit, until it is lodged against the end wall of the enlarged portion of shaft 10 which marks the juncture between the enlarged and reduced portions of the shaft. Collar 15 thus frictionally engages shaft 10 and rotates therewith. The end face 16 of collar 15 provides a bearing or seal surface which rubs against the opposed face or bearing surface of a stationary annular bearing insert 17 to form a seal for preventing the escape of vapors or fluid along the shaft 10. As clearly shown in the drawings, bearing member 17 has a larger internal diameter than the shaft to permit free rotation of the shaft within the bearing. Both collar 15 and insert 17 are formed of some suitable hard wear-resisting bearing material such as bronze, metal alloys and the like. The insert 17 is provided with oil holes 18 (Figs. 1 and 3) which communicate with an annular oil groove 19 to which oil may be supplied in a manner to be hereinafter described. The oil flows from the annular groove 19, through the oil holes 18 to lubricate the opposed rubbing surfaces of collar 15 and insert 17, forming the seal.

Bearing insert 17 is retained against rotation by a suitable metal retainer 20 of annular form, which frictionally engages the top surface of insert 19. To insure against rotation of bearing insert 17 I may use any suitable means, such as the pin 17' which extends through retainer 20 and into insert 17. Retainer 20 is provided with an annular recess which coacts with an annular ledge or boss on insert 17 to urge insert 17 against the collar 15 to maintain the seal in a manner to be described.

Retainer 20 is shown in section and has an annular extension 21 extending parallel to shaft 10 and overlying and encircling a portion of sleeve 14. The end of extension 21 is preferably provided with an inclined surface. A flange 22 formed on retainer 20 extends outwardly and is spaced from and opposed to wall 13. The end portion of extension 21 extends into a relatively movable annular packing gland 23 to provide an annular seal chamber which contains a suitable packing material 24. Gland 23 has a substantially inverted L-shaped cross-section. The cylindrical portion thereof overlies and encircles the end portion of extension 21 with the opposed surfaces contacting each other. The inwardly directed ring formed thereon is provided with an inclined surface which is opposed to the inclined surface of extension 21 and forms therewith the chamber for the packing 24. While this chamber is shown as having a trapezoidal section, it is obvious that shape is not important since the sealing function is partly effected by means of the packing.

The stationary packing 24 is compressed and forced against the sleeve 14 to form the seal by means of a series of spaced, resilient means such as the springs 25 (Figs. 1 and 4) which yieldingly urge the annular gland 23 towards the extension 21 of retainer member 20 and thereby decreases the size of the stationary packing chamber. At one end, the springs 25 are secured to adjustable threaded pins 26 which extend through a series of openings in leg 22 of retainer member 20 and are held in place by the adjustable nuts 27. At the other end, springs 25 are secured to stationary pins or lugs 28 which are integrally secured to gland 23 as by a weld or the like.

The opposed bearings or rubbing surfaces of the collar 15 and the bearing member 17 are pressed together to form the rubbing-type seal by means of a series of spaced, resilient means such as the springs 28 (Figs. 1 and 4) which yieldingly urge the retainer member 20 and its associated bearing member 17 towards the stationary wall 13. At one end the springs 28 are secured to adjustably threaded pins 29 which extend through a series of openings in leg 22 which in turn alternate with the heretofore described openings. Pins 29 are held in place by the adjustable nuts 30. The other ends of springs 28 are secured to opposed pins or lugs 31 which are positioned in suitable openings in plate 31 and secured integrally therewith as by a weld.

It is apparent from the foregoing that the means for compressing the stationary packing 24 and the means for holding the rubbing surfaces forming the rubbing-type seal are separate and independently adjustable. This is of prime importance since the pressure on the stationary packing 24 varies with the type of packing material employed and the pressures of the fluid which this packing must resist. Since the associated parts constituting seal 12 do not rotate, it is furthermore apparent that the independent adjusting means have a further advantage from the standpoint of adjustment, inspection and freedom from vibration and from centrifugal effects on the springs 25 and 28. Any tendency for rotation that the bearing member 17 and retaining member 20 may have is readily overcome by means of the pin 33 (Figs. 2–4) which passes through a slot in leg 22 and is threaded into stationary plate 13.

The packing seal used in accordance with my invention is stationary and is used on rotating shafts in apparatus of the type described above. The seal is particularly adapted for use on centrifugal fluid-treating apparatus wherein a heavier fluid is propelled outwardly in a path of increasing radius and counter-currently to a lighter fluid urged inwardly. In operation, springs 25 compress packing material 24 to prevent the escape of fluid from within the housing (not shown) and springs 28 bring the rubbing surfaces together to seal-off or prevent the escape of fluid particularly gases under pressure along the shaft. It is apparent from the foregoing description taken in conjunction with the drawings that I have provided a minimum of rubbing surface or area in my seal, and the rubbing velocity between the surfaces constituting the seal is largely independent of the diameter of the shaft. During rotation of the shaft, a lubricant may be provided at the rubbing surfaces through the oil holes 18. Oil or the like is supplied to these oil holes through an inlet connection 32 (Figs. 1 and 3) on leg 22 of retainer member 20 which communicates with the annular oil groove 19 and in turn with the oil holes 18 in bearing member 17.

I claim:

1. In combination with a rotating shaft having a bearing surface, a stationary shaft sealing means comprising an annular member of angular section having a wall extending transversely to the shaft and a sleeve parallel and circumferentially thereof, an annular member having an annular bearing member presenting a bearing surface in opposed contiguous relationship to said shaft bearing surface, said second annular member having a flange parallel to and spaced from the transversely extending wall of the first named annular member and an extension parallel to and circumferentially of a portion of the sleeve of the first named annular member, a relatively movable annular packing gland forming a packing chamber with the sleeve of the first named annular member and with the end of the extension of the second named annular member, a packing material in said packing chamber, means for urging said annular bearing member towards said shaft bearing surface to maintain said bearing surfaces in contacting relatively rotatable relationship to provide a shaft seal and means for urging the packing gland towards said second named annular member to compress the packing and provide a second seal.

2. The combination set forth in claim 1 in which the means for urging said bearings surfaces into contact comprises independently adjustable springs extending between and secured to the opposed transversely extending legs of said annular members and in which the means for compressing the packing material comprises independently adjustable springs extending between and secured to the flange of the second named annular member and the annular packing gland.

3. The combination set forth in claim 1 in which the rotating shaft has a portion of reduced diameter and the bearing surface on the shaft is on the end of the enlarged portion of the shaft at the juncture of the portion of the shaft of reduced diameter and in which the bearing member overlies the portion of reduced diameter and presents an end bearing surface which contacts with the bearing surface on the enlarged portion of the shaft.

WALTER J. PODBIELNIAK.